US007260998B2

(12) United States Patent
Madden et al.

(10) Patent No.: US 7,260,998 B2
(45) Date of Patent: Aug. 28, 2007

(54) APPARATUSES AND METHODS FOR STRUCTURALLY TESTING FASTENERS

(75) Inventors: Stella B. Madden, Seattle, WA (US);
Thomas J. Lowe, Seattle, WA (US);
Mark A. Woods, Seattle, WA (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 11/085,032

(22) Filed: Mar. 18, 2005

(65) Prior Publication Data
US 2006/0207337 A1    Sep. 21, 2006

(51) Int. Cl.
F16B 31/02    (2006.01)
(52) U.S. Cl. .................. 73/761; 73/826; 73/856; 73/859
(58) Field of Classification Search ............ 73/761, 73/860, 859, 856, 826; 470/47
See application file for complete search history.

(56) References Cited

U.S. PATENT DOCUMENTS

| 3,643,544 A | 2/1972 | Massa |
| 3,702,087 A | 11/1972 | Schmitt |
| 3,728,933 A | 4/1973 | Grube |
| 3,737,169 A | 6/1973 | Glynn |
| 3,757,725 A | 9/1973 | Horn |
| 3,839,109 A | 10/1974 | Horn |
| 3,961,336 A | 6/1976 | Walker et al. |
| 3,987,668 A | 10/1976 | Popenoe |
| 4,094,116 A | 6/1978 | Gilb |
| 4,179,786 A | 12/1979 | Eshghy |
| 4,198,737 A | 4/1980 | Eshghy |
| 4,219,920 A | 9/1980 | Eshghy |

(Continued)

FOREIGN PATENT DOCUMENTS

EP    0 179 431    5/1991

(Continued)

OTHER PUBLICATIONS

Bolt Force Sensor Load Cell from Lebow; InterTechnology; 3 pgs; Mar. 18, 2005; http:www/intertechnology.com/Lebow/lebow_bolt_force_sensor_load_cells.htm.

(Continued)

*Primary Examiner*—Edward Lefkowitz
*Assistant Examiner*—Punam Patel
(74) *Attorney, Agent, or Firm*—Perkins Coie LLP

(57) ABSTRACT

Apparatuses and methods for structurally testing fasteners are described herein. A fastener test apparatus configured in accordance with one aspect of the invention includes a first support member configured to support a head portion of a fastener, and a second support member configured to support a locking feature on a shaft portion of the fastener. The test apparatus can also include a force measurement device configured to be operably sandwiched between the first support member and the second support member. The force measurement device can be used to measure fastener preload. The test apparatus can further include first and second fixtures for performing an ultimate tensile test of the fastener. In this regard, the first fixture can be configured to exert a first force against the first support member in a first direction, and the second fixture can be configured to exert a second force against the second support member in a second direction opposite the first direction.

22 Claims, 3 Drawing Sheets

U.S. PATENT DOCUMENTS

| | | |
|---|---|---|
| 4,219,921 A | 9/1980 | Eshghy |
| 4,219,922 A | 9/1980 | Eshghy |
| 4,226,014 A | 10/1980 | Eshghy |
| 4,226,015 A | 10/1980 | Eshghy |
| 4,228,576 A | 10/1980 | Eshghy |
| 4,233,721 A | 11/1980 | Eshghy |
| 4,233,722 A | 11/1980 | Eshghy |
| 4,233,723 A | 11/1980 | Eshghy |
| 4,235,006 A | 11/1980 | Eshghy |
| 4,244,095 A | 1/1981 | Eshghy |
| 4,245,381 A | 1/1981 | Eshghy |
| 4,246,685 A | 1/1981 | Eshghy |
| 4,255,846 A | 3/1981 | Eshghy |
| 4,259,772 A | 4/1981 | Eshghy |
| 4,259,773 A | 4/1981 | Eshghy |
| 4,259,775 A | 4/1981 | Eshghy |
| 4,267,629 A | 5/1981 | Eshghy |
| 4,268,944 A | 5/1981 | Eshghy |
| 4,274,188 A | 6/1981 | Eshghy |
| 4,280,380 A | 7/1981 | Eshghy |
| 4,285,112 A | 8/1981 | Eshghy |
| 4,286,370 A | 9/1981 | Craig |
| 4,338,054 A | 7/1982 | Dahl |
| 4,348,141 A | 9/1982 | Dahl |
| 4,361,945 A | 12/1982 | Eshghy |
| 4,368,755 A | 1/1983 | King |
| 4,380,108 A | 4/1983 | Craig |
| RE31,569 E | 5/1984 | Walker et al. |
| 4,445,534 A | 5/1984 | King |
| 4,472,096 A | 9/1984 | Ruhl et al. |
| 4,473,230 A | 9/1984 | Adamek |
| 4,478,243 A | 10/1984 | King |
| 4,528,864 A | 7/1985 | Craig |
| 4,554,838 A * | 11/1985 | Paus ............................ 73/761 |
| 4,558,599 A * | 12/1985 | Sachs .......................... 73/761 |
| 4,606,674 A | 8/1986 | Capron |
| 4,688,317 A | 8/1987 | Matuschek |
| 4,773,272 A | 9/1988 | Trungold |
| 4,866,992 A | 9/1989 | Rice et al. |
| 4,879,859 A | 11/1989 | Dykmans |
| 4,880,257 A | 11/1989 | Holbert, Jr. |
| 4,888,663 A | 12/1989 | Longerich et al. |
| 4,903,603 A | 2/1990 | Longerich et al. |
| 4,904,137 A | 2/1990 | Matuschek |
| 4,922,381 A | 5/1990 | Longerich et al. |
| 4,944,188 A * | 7/1990 | Dial ............................ 73/761 |
| 5,020,741 A | 6/1991 | Ziegler et al. |
| 5,062,293 A | 11/1991 | Bakirov et al. |
| 5,090,852 A | 2/1992 | Dixon |
| 5,105,590 A | 4/1992 | Dykmans |
| 5,134,830 A | 8/1992 | Dykmans |
| 5,177,919 A | 1/1993 | Dykmans |
| 5,268,001 A | 12/1993 | Nicholson et al. |
| 5,431,062 A | 7/1995 | Baratta |
| 5,491,941 A | 2/1996 | Lancelot, III |
| 5,498,186 A | 3/1996 | Benz et al. |
| 5,498,187 A | 3/1996 | Eggleston et al. |
| 5,548,628 A | 8/1996 | Eggleston et al. |
| 5,566,055 A | 10/1996 | Salvi, Jr. |
| 5,655,000 A | 8/1997 | Benz et al. |
| 5,715,894 A * | 2/1998 | Maruyama et al. ......... 173/180 |
| 5,792,961 A * | 8/1998 | Giebner et al. ............... 73/826 |
| 5,882,442 A | 3/1999 | Caron et al. |
| 6,041,660 A * | 3/2000 | Fujitaka et al. ............... 73/826 |
| 6,216,804 B1 | 4/2001 | Aumann et al. |
| 6,230,733 B1 | 5/2001 | Strelow et al. |
| 6,230,825 B1 | 5/2001 | Aumann et al. |
| 6,233,802 B1 | 5/2001 | Fulbright |
| 6,248,117 B1 | 6/2001 | Blatter |
| 6,305,482 B1 | 10/2001 | Aumann et al. |
| 6,357,543 B1 | 3/2002 | Karpik |
| 6,378,631 B1 | 4/2002 | Aumann et al. |
| 6,497,024 B2 | 12/2002 | Fulbright |
| 6,499,551 B2 | 12/2002 | Karpik |
| 6,561,302 B2 | 5/2003 | Karpik |
| 6,623,494 B1 | 9/2003 | Blatter |
| 6,659,204 B2 | 12/2003 | Aumann et al. |
| 6,664,714 B2 | 12/2003 | Magnussen et al. |
| 6,690,101 B2 | 2/2004 | Magnussen et al. |
| 6,695,845 B2 | 2/2004 | Dixon et al. |
| 6,726,422 B2 | 4/2004 | Giannakakos |
| 2001/0029651 A1 | 10/2001 | Fulbright |
| 2002/0033281 A1 | 3/2002 | Aumann et al. |
| 2002/0038986 A1 | 4/2002 | Magnussen et al. |
| 2002/0038987 A1 | 4/2002 | Magnussen et al. |
| 2002/0045897 A1 | 4/2002 | Dixon et al. |
| 2002/0050765 A1 | 5/2002 | Magnussen et al. |
| 2002/0053477 A1 | 5/2002 | Karpik |
| 2002/0173846 A1 | 11/2002 | Blake et al. |
| 2002/0175013 A1 | 11/2002 | Karpik |
| 2003/0014064 A1 | 1/2003 | Blatter |
| 2003/0086772 A1 | 5/2003 | Giannakakos |
| 2003/0145657 A1 * | 8/2003 | Engler et al. ................. 73/761 |
| 2004/0095040 A1 | 5/2004 | Magnussen et al. |
| 2004/0097994 A1 | 5/2004 | Blatter |

FOREIGN PATENT DOCUMENTS

| | | |
|---|---|---|
| EP | 0 233 938 | 3/1992 |
| EP | 0 262 818 | 5/1992 |
| EP | 0 769 563 | 4/1997 |
| EP | 0 739 479 | 5/1997 |
| EP | 0 813 805 | 9/1998 |
| EP | 0 557 306 | 12/1998 |
| WO | WO-86/06447 | 11/1986 |
| WO | WO-87/01060 | 2/1987 |
| WO | WO-92/04874 | 4/1992 |
| WO | WO-96/28007 | 9/1996 |
| WO | WO-00/06866 | 2/2000 |
| WO | WO-00/17478 | 3/2000 |
| WO | WO-01/11248 | 2/2001 |
| WO | WO-01/71899 | 9/2001 |
| WO | WO-02/060346 | 8/2002 |
| WO | WO-03/051247 | 6/2003 |
| WO | WO-03/051262 | 6/2003 |
| WO | WO-03/053290 | 7/2003 |
| WO | WO-2004/016207 | 2/2004 |

OTHER PUBLICATIONS

Fastener Test Methods, Method 8, Tensile Strength; National Aerospace Standard; Apr. 2001; 17 pgs; Aerospace Industries Associate of America, Inc.

Load Cell—Load Cell Accessories—Load Cell Displays; Transducer Techniques; National Instrument; 2 pgs; http://www.ttloadcells.com; [accessed Jan. 28, 2005].

Load Cells; Load Buttons and Load Washers—Interface Force.com; Interface Advanced Force Measurement; (2 pgs); http://www.interfaceforce.com/load_btnswashers.html; [accessed Mar. 18, 2005].

* cited by examiner

APPARATUSES AND METHODS FOR STRUCTURALLY TESTING FASTENERS

TECHNICAL FIELD

The following disclosure is generally related to apparatuses and methods for structurally testing fasteners.

BACKGROUND

There are a wide variety of fasteners available today to suit many different applications. Nut and bolt combinations are very popular because of their relatively high strength and versatility. Other types of structural fasteners include blind fasteners and lock bolts which have formed or swaged-on locking elements.

Regardless of the particular type of fastener, in many applications it is important to know the tension load developed in the fastener upon installation (i.e., the preload), as well as the ultimate tensile strength of the fastener. Current methods for determining the preload and ultimate tensile strength of fasteners, however, can be time-consuming, inaccurate, and potentially damaging to the load measuring device. One known method, for example, involves a two step process. The first step requires installing the fastener in a first load test fixture. The first load test fixture includes a load measuring device (e.g., a relatively small load cell) positioned under the head of the fastener to measure fastener preload. The second step requires removing the fastener from the first test fixture (or, alternatively, using another fastener), and then installing the fastener in a second load test fixture to determine the ultimate tensile strength of the fastener. Although removing the fastener from the first load test fixture is time-consuming, this two-step process is widely used to avoid damaging the load measuring device during the subsequent ultimate tensile test.

SUMMARY

This summary is provided for the benefit of the reader only, and does not limit the invention as set forth by the claims. The present invention is directed generally toward apparatuses and methods for structurally testing fasteners for use in aerospace and other applications. A fastener test apparatus configured in accordance with one aspect of the invention includes a first support member, a second support member, and a force measurement device configured to be operably sandwiched between the first and second support members. The first support member can be configured to support a head portion of a fastener, and the second support member can be configured to support a locking feature positioned on a shaft portion of the fastener. The fastener test apparatus can further include a first test fixture and a second test fixture. The first test fixture can be configured to exert a first force against the first support member in a first direction. The second test fixture can be configured to exert a second force against the second support member in a second direction opposite to the first direction. Exerting the first force against the first support member and the second force against the second support member in the foregoing manner causes the first and second support members to apply a tensile force to the fastener.

In one embodiment of the fastener test apparatus, the force measurement device can include a central passageway extending therethrough. In this embodiment, the first support member can include a fastener support portion configured to extend at least partially into the central passageway. The fastener support portion can include a support surface configured to support the head portion of the fastener within the central passageway.

A method for structurally testing a fastener in accordance with another aspect of the invention includes positioning a first support member proximate to a first side of a force measurement device, and positioning a second support member proximate to a second side of the force measurement device. The method can further include inserting a shaft portion of a fastener at least partially through the first and second support members, and positioning a locking feature on the shaft portion to apply a first tensile force to the fastener and a corresponding compressive force to the force measurement device. The method can additionally include exerting a force against the first support member to increase the tensile load in the fastener from the first tensile force to a second tensile force.

In one embodiment of the test method, exerting a force against the first support member includes pressing against the first support member with a test machine. In this embodiment, the method can further include determining the magnitude of the first tensile force by means of a first display operably connected to the force measurement device, and determining the magnitude of the second tensile force by means of a second display operably connected to the test equipment.

DETAILED DESCRIPTION

The following disclosure describes various apparatuses and methods for structurally testing fasteners for aerospace and other applications. Certain details are set forth in the following description to provide a thorough understanding of various embodiments of the invention. Other details describing well-known structures and systems often associated with fasteners and fastener test methods are not set forth, however, to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles and features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
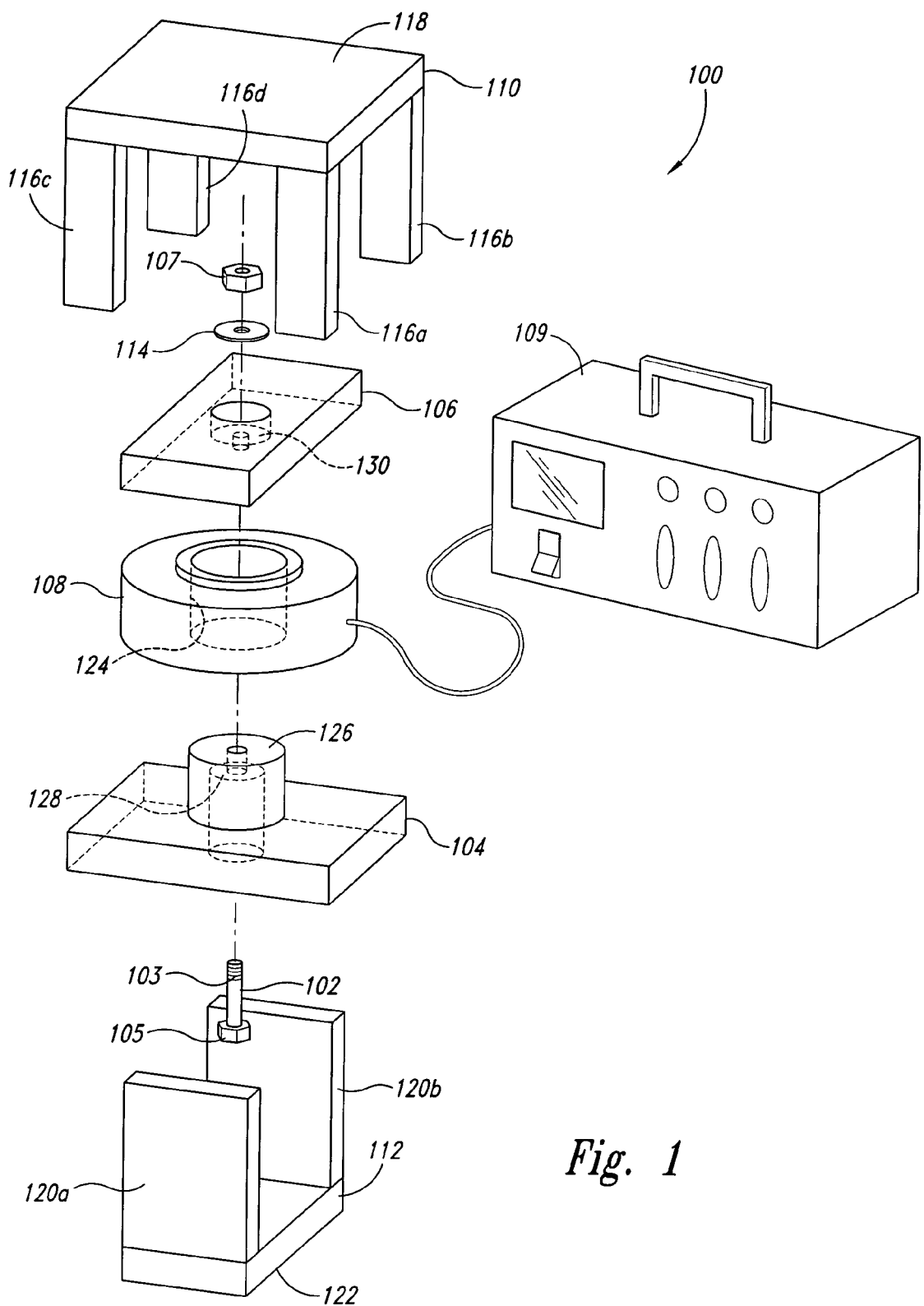
FIG. 1 is an exploded isometric view of an apparatus configured in accordance with an embodiment of the invention for structurally testing fasteners.

FIG. 1 is an exploded isometric view of an apparatus 100 configured in accordance with an embodiment of the invention for structurally testing a fastener 102. The apparatus 100 can include a first support member 104 positioned proximate to a first side of a force measurement device 108, and a second support member 106 positioned proximate to a second side of the force measurement device 108. The force measurement device 108 can include a load cell configured to measure axial compression forces. In one embodiment, for example, the force measurement device 108 can include a model THD-5K-R load cell provided by Transducer Techniques, Inc., of 42480 Rio Nedo, Temecula, Calif. 92590. In other embodiments, the force measurement device 108 can include other suitable load cells. The force measurement device 108 can be operably connected to a first display device 109 configured to provide digital and/or graphical information about the compressive force applied to the load cell, such as the magnitude of the compressive force. In one embodiment, the first display device 109 can include a model TI-3000 read-out display provided by Transducer Techniques, Inc. of Temecula, Calif. In other embodiments, the first display device 109 can include other suitable read-out displays.

The first support member 104 can include a fastener support portion 126 (e.g., a boss or similar feature) configured to project at least partially into a central passageway 124 extending through the force measurement device 108. The fastener support portion 126 can include a recessed first support surface 128 configured to support a head portion 105 of the fastener 102. As described in greater detail below, extending the fastener support portion 126 into the passageway 124 enables relatively short grip-length fasteners (e.g., the fastener 102) to be structurally tested with the test apparatus 100.

The second support member 106 can include a second support surface 130 configured to receive a test coupon 114. The test coupon 114 can be positioned between the second support surface 130 and a locking feature or element 107 configured to be engaged with a shaft portion 103 of the fastener 102. In one aspect of this embodiment, the test coupon 114 can be selected to simulate a particular type of washer. For example, the test coupon 114 can be selected to simulate the particular type of washer and/or washer material specified for use with the fastener 102 in service. Simulating the specified washer material can help ensure that the test apparatus 100 provides the same friction and requires the same torque during installation of the locking element 107 as will be experienced when installing the locking element 107 in the field.

The locking element 107 of the illustrated embodiment is a conventional nut that is threaded and/or torqued onto the shaft portion 103 of the fastener 105. In other embodiments, however, other fastener types using other types of locking features can be tested with the apparatus 100 as described herein. For example, in one other embodiment, the apparatus 100 can be used to test a blind fastener having a locking feature that is formed on a distal end of the fastener during installation. In yet other embodiments, the test apparatus 100 can be used to structurally test various types of lock-bolts having collars that are swaged or otherwise installed on a distal end of the fastener.

The test apparatus 100 can further include a first fixture 110 configured to exert a first force against the first support member 104, and a second fixture 112 configured to exert a second force against the second support member 106. In the illustrated embodiment, the first fixture 110 includes a plurality of first leg portions 116 (identified individually as first leg portions 116a-d) extending outwardly from a first base portion 118. The second fixture 112 can include a plurality of second leg portions 120 (identified individually as second leg portions 120a-b) extending outwardly from a second base portion 122. In another aspect of this embodiment, the first support member 104 is configured to fit between the second leg portions 120 of the second fixture 112, and the second support member 106 is configured to fit between the first leg portions 116 of the first fixture 110.

Figure 2:
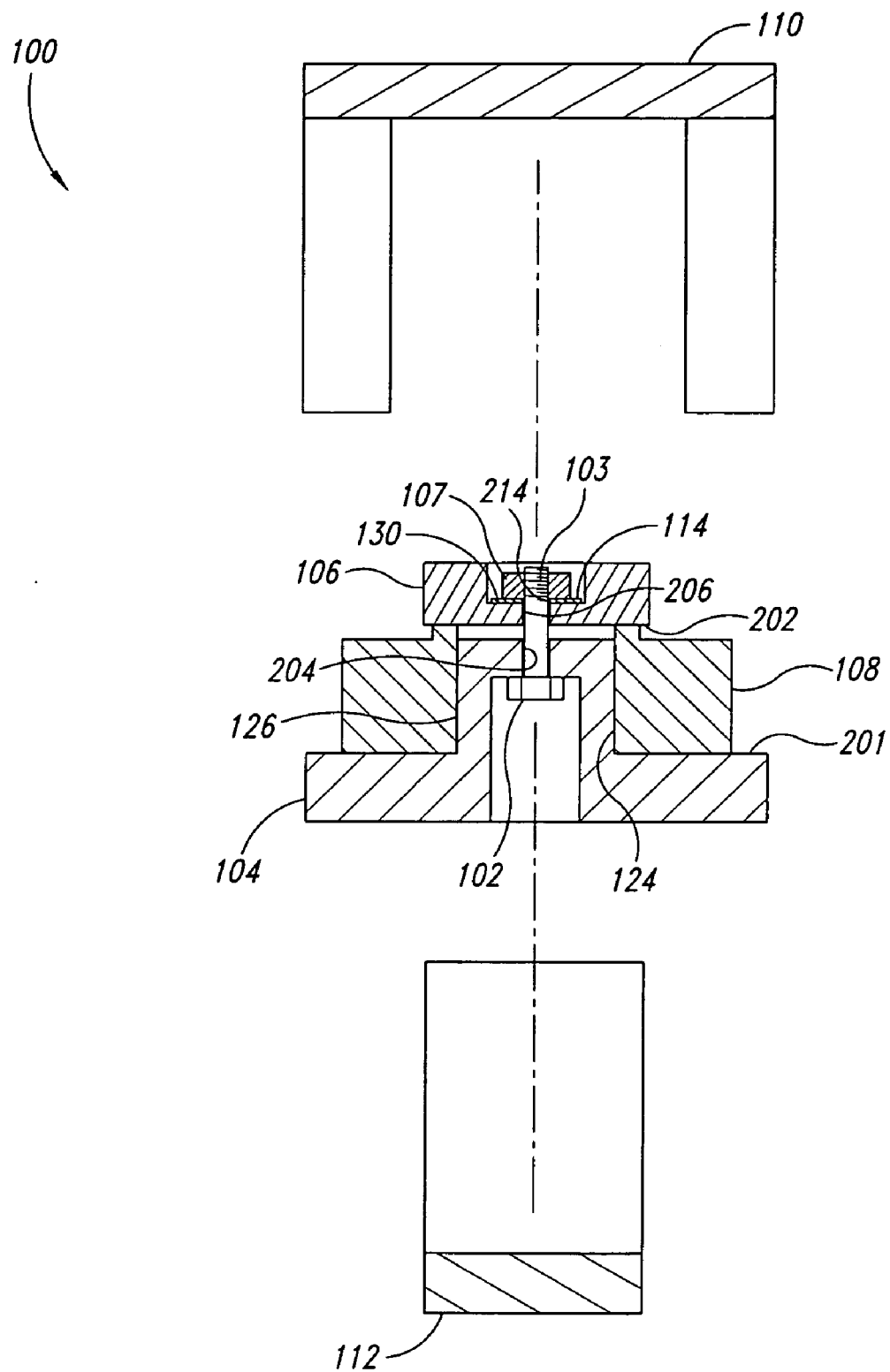
FIG. 2 is a partially exploded, side cross-sectional view of the structural test apparatus of FIG. 1 in a configuration suitable for performing a preload test of a fastener in accordance with an embodiment of the invention.

FIG. 2 is a partially exploded, side cross-sectional view of the test apparatus 100 of FIG. 1 in a configuration suitable for performing a preload test of the fastener 102. In this configuration, a first portion 201 of the first support member 104 is positioned against one side of the force measurement device 108 so that the fastener support portion 126 extends into the central passageway 124. A second portion 202 of the support member 106 is positioned against the other side of the force measurement device 108, and the test coupon 114 is positioned against the second support surface 130. The shaft portion 103 of the fastener 102 is inserted through a first aperture 204 in the first support member 104, a second aperture 206 in the second support member 106, and a third aperture 214 in the test coupon 114. The locking element 107 is then engaged with the shaft portion 103 and tightened against the test coupon 114.

The locking element 107 can be progressively tightened against the test coupon 114 to perform a preload test of the fastener 102. As the locking element 107 is tightened, the increasing tensile load in the fastener 102 is reacted by a proportional compressive load in the force measurement device 108. As the load in the force measurement device 108 increases, the magnitude of the tensile force applied to the fastener 102 (or a related parameter, e.g., tensile stress) can be provided by the display device 109 (FIG. 1). In the foregoing manner, the preload in the fastener 102 can be correlated to the torque applied to the locking element 107. With this information, the torque necessary to achieve the desired preload can be determined and specified for use when installing the fastener 102 in the field.

As those of ordinary skill in the art are aware, fastener preload tends to decrease over time as the assembled parts begin to relax. With the embodiment of FIG. 2, the decrease in preload over time can be monitored and, if the decrease is significant, a re-torque of the locking element 107 can be specified for installation of the fastener 102 in the field. Once the preload in the fastener 102 has been measured in the foregoing manner, the first fixture 110 and the second fixture 112 can be used to perform an ultimate tensile test of the fastener 102 as described in more detail below with reference to FIG. 3.

Figure 3:
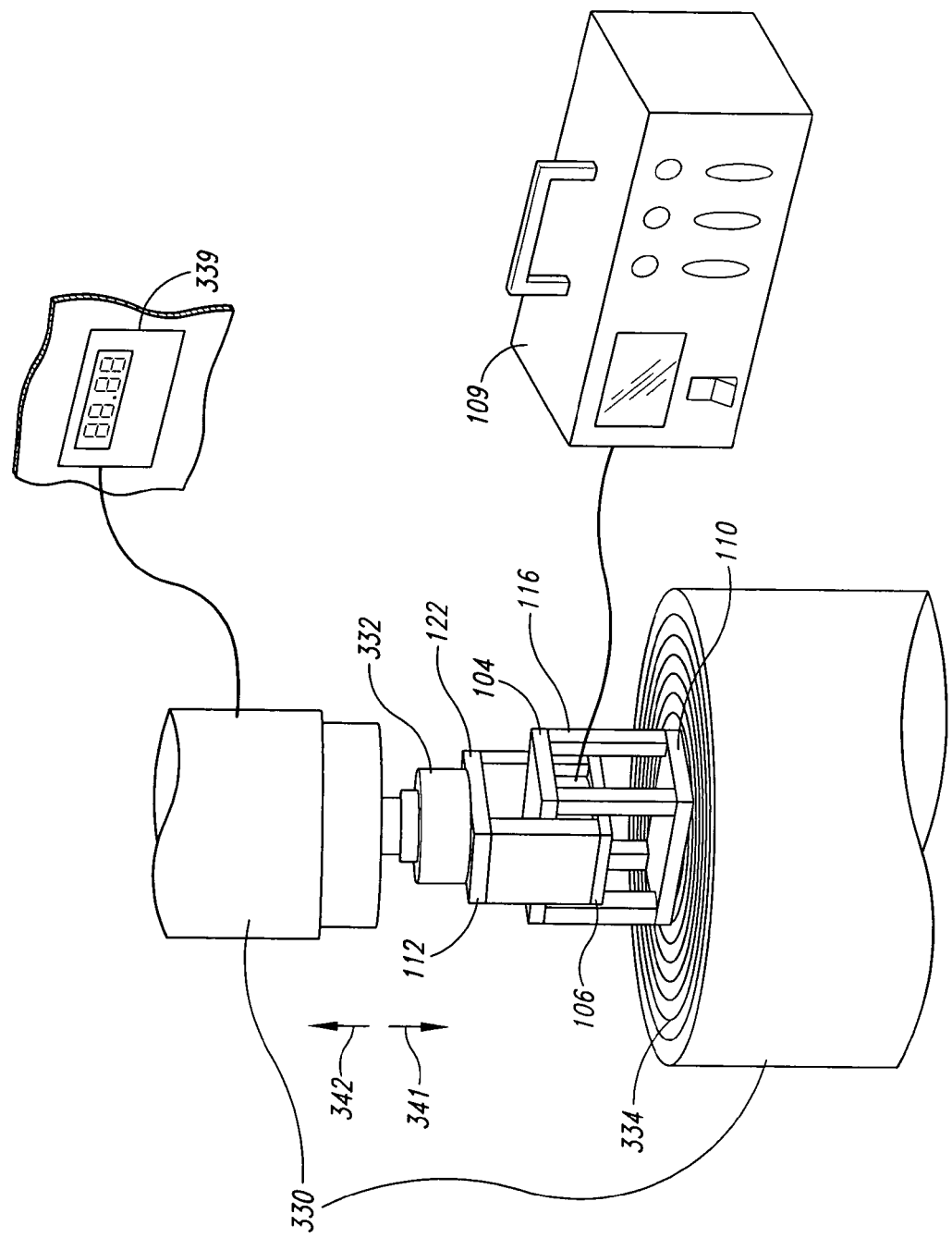
FIG. 3 is an isometric view of the structural test apparatus of FIG. 1 mounted on a structural test machine in a configuration suitable for performing an ultimate tensile test of a fastener in accordance with an embodiment of the invention.

FIG. 3 is an isometric view of the test apparatus 100 mounted on a structural test machine 330 in accordance with an embodiment of the invention. In the illustrated embodiment, the test machine 330 is at least generally similar in structure and function to a conventional tension/compression test machine having a movable load head 332 positioned relative to a table 334. In one embodiment, for example, the testing machine 330 can be a conventional Tinius-Olson tension/compression test machine. In other embodiments, other testing machines capable of exerting controlled compressive and/or tensile forces can be used. The test machine 330 can be operably connected to a second display device 339 (e.g., a digital/graphical display device) for providing real-time readout of the force applied by the load head 104.

To perform an ultimate tensile test of the fastener 102 (FIGS. 1 and 2), the first fixture 110 is positioned on the table 334 so that the first leg portions 116 project upwardly toward the load head 332. The first support member 104 is then placed on top of the first leg portions 116 so that the second support member 106 hangs down between the leg portions 116. (Note: the components of the test apparatus 100 illustrated in FIG. 3 are inverted relative to their orientations in FIGS. 1 and 2.) The second fixture 112 is then positioned on top of the second support member 106 with the second leg portions 120 extending downwardly around the first support member 104. Next, the load head 332 is lowered until it contacts the second fixture 112. The load head 332 then exerts a first force against the second support member 106 in a first direction 341. The first force is reacted by the first fixture 110, which in turn exerts an opposite second force against the first support member 104 in a second direction 342. The opposing first and second forces are reacted solely by the fastener 102 (FIGS. 1 and 2), and the force measurement device 108 does not carry any of this load. As the force from the load head 332 increases, the tensile load in the fastener 102 also increases, until ultimately the fastener 102 experiences a tension failure. The second display device 339 can provide real-time readout of the tension load in the fastener 102 at the time of failure.

One feature of the embodiment of the invention described above with reference to FIGS. 1-3 is that the fastener 102 breaks out of the test apparatus 100 at the completion of the ultimate tensile test. One advantage of this feature is that eliminates the need to manually disassemble the fastener and remove it from a separate preload test fixture. Removing the fastener is especially time consuming in those cases where a swaged-on collar or other type of locking element is used that cannot be easily removed.

Another feature of the embodiment of the invention described above with reference to FIGS. 1-3 is that two pieces of test data can be obtained from a single test apparatus. For example, the configuration of FIG. 2 can be used to obtain preload data, and then (without having to disassemble the test apparatus) the configuration of FIG. 3 can be used to obtain ultimate tensile data. An advantage of this feature is that structural testing can be efficiently carried out for a large number of fasteners in a relatively short period of time.

A further feature of the embodiment described above is that it can be used to test relatively short grip-length fasteners. For example, as those of ordinary skill in the art are aware, most annular load cells (e.g., the force measurement device 108) of medium to high accuracy have thicknesses of about 0.50 inch or more. As a result, short grip-length fasteners cannot extend all the way through such load cells. The fastener support portion 126 on the first support member 104 solves this problem, however, because it is recessed and positions the head portion 105 of the fastener 102 down within the force measurement device 108.

Another advantage of the embodiment described above is that it can provide constant read-out of tensile load as the locking element 107 is being torqued onto the fastener 102. In contrast, some conventional methods for measuring fastener preload (i.e., those test methods using a paddle, shim or similar device clamped between the fastener head and locking element) do not measure preload as a function of applied torque, but only the total preload. In a similar vein, the test apparatus 100 provides the further advantage of allowing the reduction in preload to be measured as the clamped-up assembly relaxes over time.

Another feature of embodiment described above is that the force measurement device 108 is positioned between the first support member 104 and the second support member 106, and not directly under the fastener head portion 105 or the locking element 107. The benefit of this feature is that the force measurement device 108 is not susceptible to damage during the ultimate tensile testing of the fastener 102. For example, some preload test methods use a washer-like load cell positioned under the fastener head, nut, or other locking element. In these methods, if the load cell is left in place during ultimate tensile testing of the fastener, the load cell is subjected to the ultimate tensile load on the fastener. If the load cell is not designed for this load range, it can be damaged. In contrast, during ultimate tensile testing with the test apparatus 100, the load on the force measurement device 108 is relieved. As a result, this set up is much less likely to result in damage to the force measurement device 108.

From the foregoing, it will be appreciated that specific embodiments of the invention have been described herein for purposes of illustration, but that various modifications may be made without deviating from the spirit and scope of the invention. Further, aspects of the invention described in the context of particular embodiments may be combined or eliminated in other embodiments. For example, in other embodiments, other load-measuring means, e.g., Belleville washers or similar devices, can be employed in place of the digital load-measuring devices described above. In yet other embodiments, the geometry of the respective load fixtures may vary somewhat from that disclosed above. In addition, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:
1. A fastener test apparatus comprising:
a first support member configured to support a head portion of a fastener;
a second support member configured to support a locking feature positioned on a shaft portion of the fastener;
a force measurement device configured to be operably sandwiched between a first portion of the first support member and a second portion of the second support member;
a first fixture configured to exert a first force against the first support member in a first direction; and
a second fixture configured to exert a second force against the second support member in a second direction opposite to the first direction, wherein exerting the first force against the first support member and the second force against the second support member causes the first and second support members to apply a tensile force to the fastener, wherein the first fixture includes at least first and second leg portions extending outwardly from a first base portion, and the second fixture includes at least third and fourth leg portions extending outwardly from a second base portion, wherein the first and second leg portions are configured to press against the first support member in the first direction, and the third and fourth leg portions are configured to press against the second support member in the second direction, and wherein the first support member is configured to fit at least partially between the third and fourth leg portions, and the second support member is configured to fit at least partially between the first and second leg portions.

2. The apparatus of claim 1 wherein the first fixture is configured to press against the first support member in the first direction and the second fixture is configured to press against the second support member in the second direction.

3. The apparatus of claim 1 wherein the force measurement device includes a central passageway, and wherein the first support member includes a fastener support portion configured to extend at least partially into the central passageway.

4. The apparatus of claim 1 wherein the force measurement device includes a central passageway, wherein the first support member includes a boss configured to extend at least partially into the central passageway, and wherein the boss includes a support surface configured to support the head portion of the fastener within the central passageway.

5. The apparatus of claim 1 wherein the second support member includes a support surface, and wherein the apparatus further comprises a test coupon configured to be sandwiched between the locking feature and the support surface.

6. The apparatus of claim 1 wherein the second support member is configured to support a nut threadably engaged with the shaft portion of the fastener.

7. The fastener test apparatus of claim 1, further comprising:
   first load means for applying a first tensile force to the fastener;
   first measuring means for measuring the first tensile force;
   second load means for increasing the tensile load in the fastener from the first tensile force to a second tensile force without first relieving the first tensile force in the fastener; and
   second measuring means for measuring the second tensile force.

8. The system of claim 7 wherein the first tensile force is a preload and the second tensile force is an ultimate tensile load.

9. The system of claim 7 wherein the first load means include means for engaging a locking element with a portion of the fastener.

10. The system of claim 7 wherein the first load means include means for torquing a nut threaded onto the fastener.

11. The system of claim 7 wherein the first measuring means include a force measurement device operably positioned between a head portion of the fastener and a locking element engaged with a shaft portion of the fastener.

12. The system of claim 7 wherein the first measuring means are positioned between a head portion of the fastener and a locking element engaged with a shaft portion of the fastener, and the second measuring means is operably connected to the second load means.

13. The system of claim 7 wherein increasing the tensile load in the fastener from the first tensile force to the second tensile force relieves the load in the first measuring means.

14. A method for structurally testing a fastener, the method comprising:
   positioning a first support member proximate to a first side of a force measurement device;
   positioning a second support member proximate to a second side of the force measurement device;
   inserting a shaft portion of a fastener at least partially through the first and second support members;
   positioning a locking feature on the shaft portion of the fastener to apply a tensile force to the fastener and a corresponding compressive force to the force measurement device; and
   applying an external force against the first support member to increase the tensile force in the fastener.

15. The method of claim 14 wherein positioning a locking feature on the shaft portion of the fastener applies a preload to the fastener, and wherein the method further comprises determining the magnitude of the preload by means of a display operably connected to the force measurement device.

16. The method of claim 14 wherein positioning a locking feature on the shaft portion of the fastener applies a first tensile force to the fastener, wherein applying an external force against the first support member includes pressing against the first support member with a structural test machine to apply a second tensile force to the fastener, and wherein the method further comprises:
   determining the magnitude of the first tensile force by means of a first display operably connected to the force measurement device; and
   determining the magnitude of the second tensile force by means of a second display operably connected to the structural test machine.

17. The method of claim 14 wherein applying an external force against the first support member includes exerting a first force against the first support member in a first direction while simultaneously exerting a second force against the second support member in a second direction opposite to the first direction.

18. The method of claim 14 wherein positioning a locking feature on the shaft portion of the fastener includes threading a nut onto the shaft portion of the fastener.

19. The method of claim 14 wherein positioning a locking feature on the shaft portion of the fastener includes forming the locking feature on the shaft portion of a blind fastener.

20. The method of claim 14 wherein positioning a locking feature on the shaft portion of the fastener includes swaging a collar on the shaft portion of the fastener.

21. The method of claim 14 wherein applying an external force against the first support member includes exerting a force sufficient to cause the fastener to experience tensile failure.

22. The method of claim 14, further comprising inserting the shaft portion of the fastener through an aperture in a test coupon prior to positioning a locking feature on the shaft portion of the fastener.

* * * * *